Oct. 13, 1925.
C. W. WYMAN
1,556,824
ELECTRIC CONTROLLER
Filed May 10, 1918    4 Sheets-Sheet 1
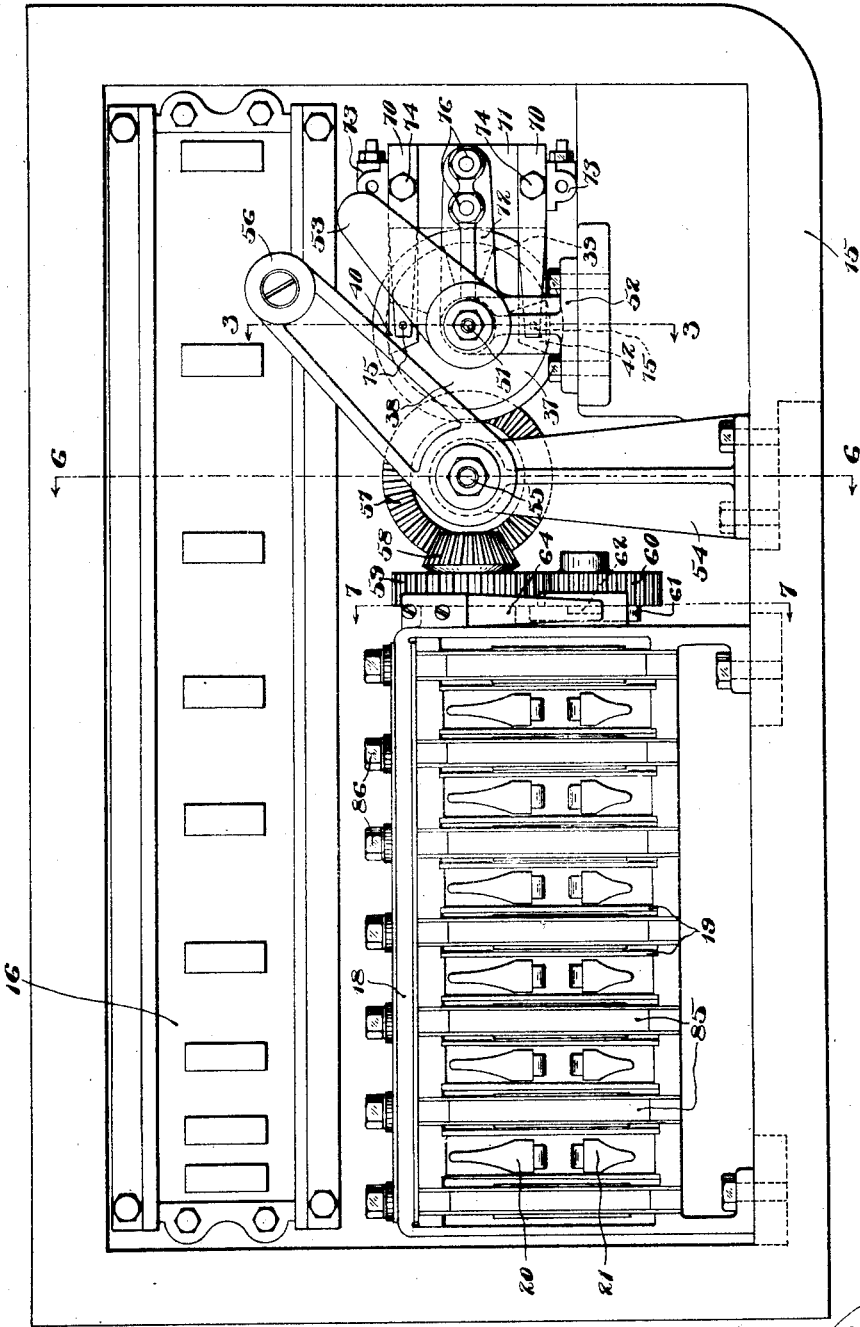

Oct. 13, 1925.　　　　　　　　　　　　　　　1,556,824
C. W. WYMAN
ELECTRIC CONTROLLER
Filed May 10, 1918　　　4 Sheets-Sheet 2
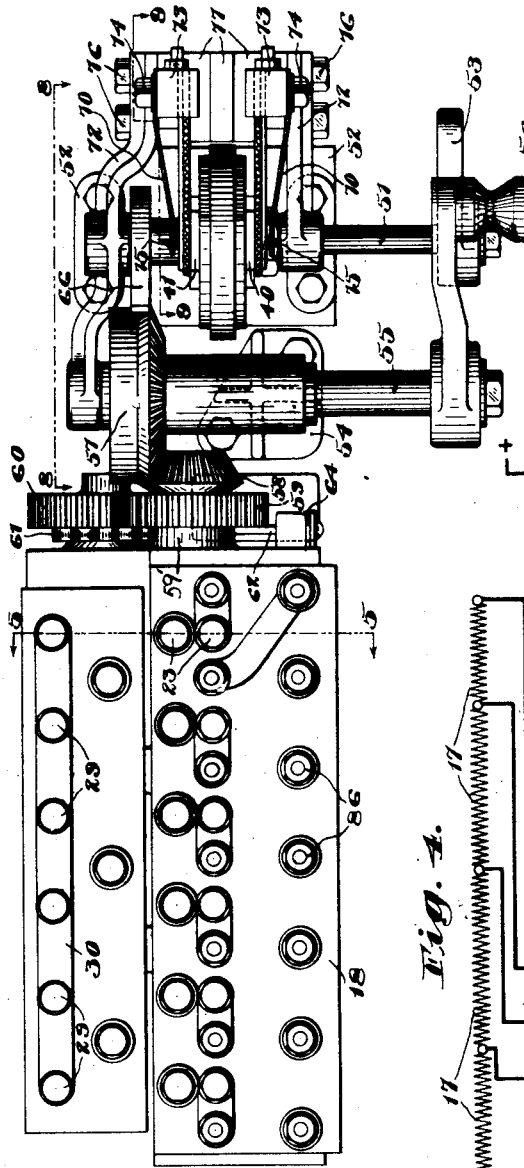
Inventor:
Charles W. Wyman.
by
　　　　atty.

Oct. 13, 1925.

C. W. WYMAN

ELECTRIC CONTROLLER

Filed May 10, 1918  4 Sheets-Sheet 3

1,556,824

Inventor:
Charles W. Wyman
by
atty.

Oct. 13, 1925.
C. W. WYMAN
1,556,824
ELECTRIC CONTROLLER,
Filed May 10, 1918
4 Sheets-Sheet 4
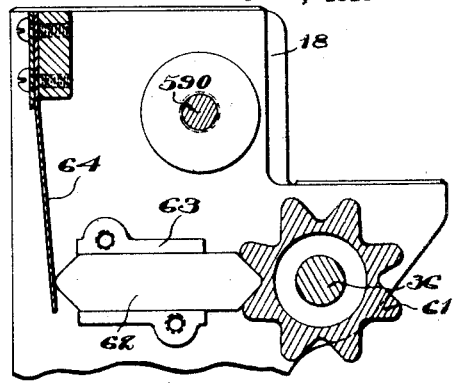
Fig. 7.
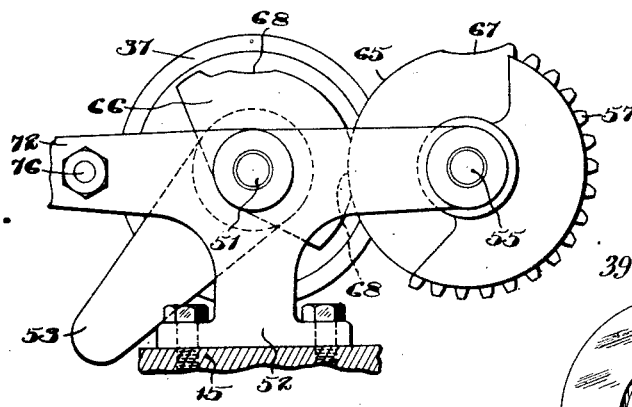
Fig. 8.
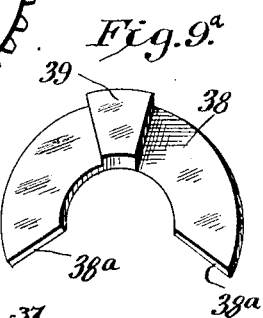
Fig. 9.ᵃ
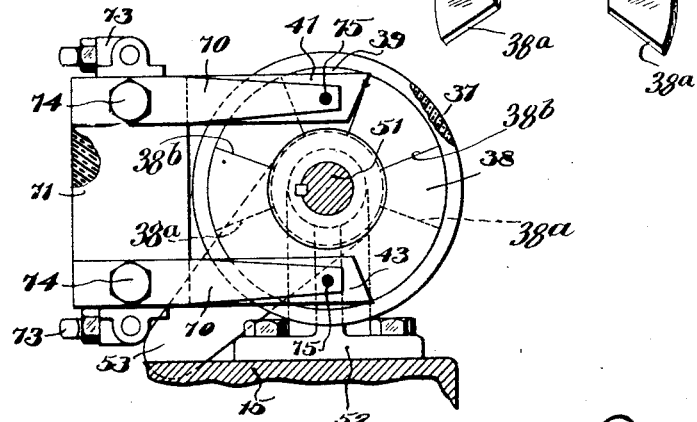
Fig. 9.
Inventor:
Charles W. Wyman.
by
Horace L. ......
Atty.

Patented Oct. 13, 1925.

1,556,824

UNITED STATES PATENT OFFICE.

CHARLES W. WYMAN, OF CLAREMONT, NEW HAMPSHIRE, ASSIGNOR TO SULLIVAN MACHINERY CORPORATION, A CORPORATION OF MASSACHUSETTS.

ELECTRIC CONTROLLER.

Application filed May 10, 1918. Serial No. 233,724.

*To all whom it may concern:*

Be it known that I, CHARLES W. WYMAN, a citizen of the United States, residing at Claremont, in the county of Sullivan and State of New Hampshire, have invented certain new and useful Improvements in Electric Controllers, of which the following is a full, clear, and exact specification.

This invention relates to electric controllers for governing the current supplied to electrically operated machinery, and more particularly to controllers for electrically operated mining machines, in which class of machines compactness of construction is a prime consideration, inasmuch as the space available for the various essential parts of the machine is extremely limited.

The invention has, therefore, for its general objects the provision of an improved controller for governing and reversing an electric motor, which controller is of compact construction requiring a minimum amount of space for its accommodation in the machine, and which includes novel interlocking mechanism for preventing the operation of the reversing switch when the current is on, and for locking the current governing mechanism against operation except when the reversing switch is in one or the other of its extreme positions. A further object is to provide an improved electrical controlling device of very compact and simple construction for effecting reversing of an electric motor.

The foregoing and other objects of the invention, together with means whereby the same may be carried into effect, will best be understood from the following description of one form or embodiment thereof illustrated in the accompanying drawings.

In these drawings,—

Fig. 1 is a front elevation with the cover of the main casing removed.

Fig. 2 is a plan view of the switch casing and the operating mechanism.

Fig. 3 is an end elevation, partly in section on the line 3—3, Fig. 1, of the reversing switch.

Fig. 4 is a diagram of the circuits and connections.

Fig. 7 is a detail section taken on the line 7—7, Fig. 1.

Figure 6:
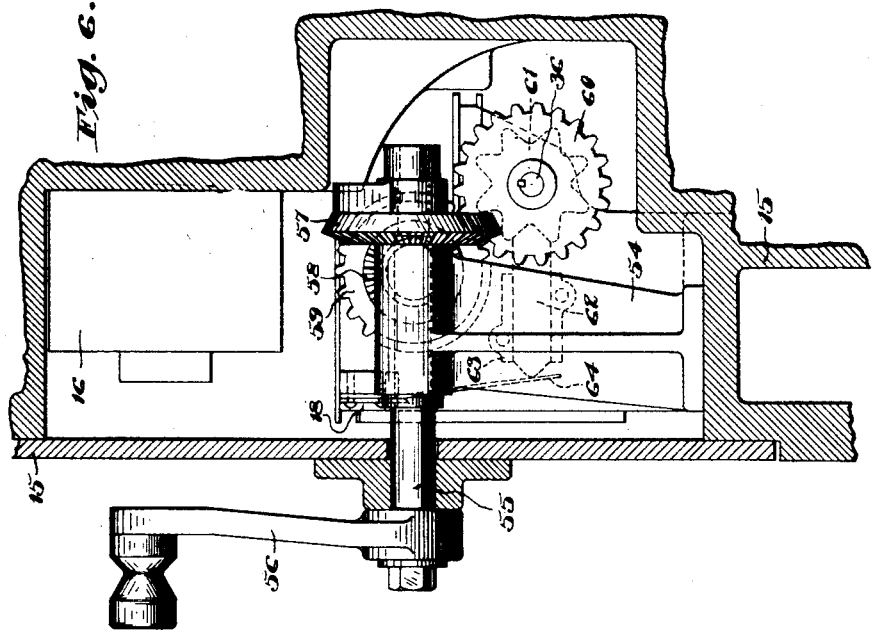
Fig. 6 is a transverse vertical section of a part of the operating mechanism taken substantially on the line 6—6, Fig. 1.

Figs. 8 and 9 are detail sections taken substantially on the lines 8—8 and 9—9, Fig. 2.

Fig. 9ª is a perspective view of one element of the reversing mechanism illustrated in Fig. 9.

Referring to Fig. 1, the apparatus as a whole may comprise a main casing 15 enclosing a resistance casing 16, containing a suitable number of resistance coils or elements 17 (see Fig. 4), connected in series, and a switch casing 18 containing a set of contact switches connected, respectively, to the several resistance elements 17 in such a manner that, by selectively closing said switches, a greater or less number of said elements may be included in the circuit, thereby varying the resistance in said circuit, as is usual in apparatus of this character. The series of resistance elements 17 is connected at one end by a conductor 47 with the series field coil 48 of the motor (herein shown as a compound wound motor), the opposite end of said coil 48 being connected with one of the line wires 49.

Figure 5:
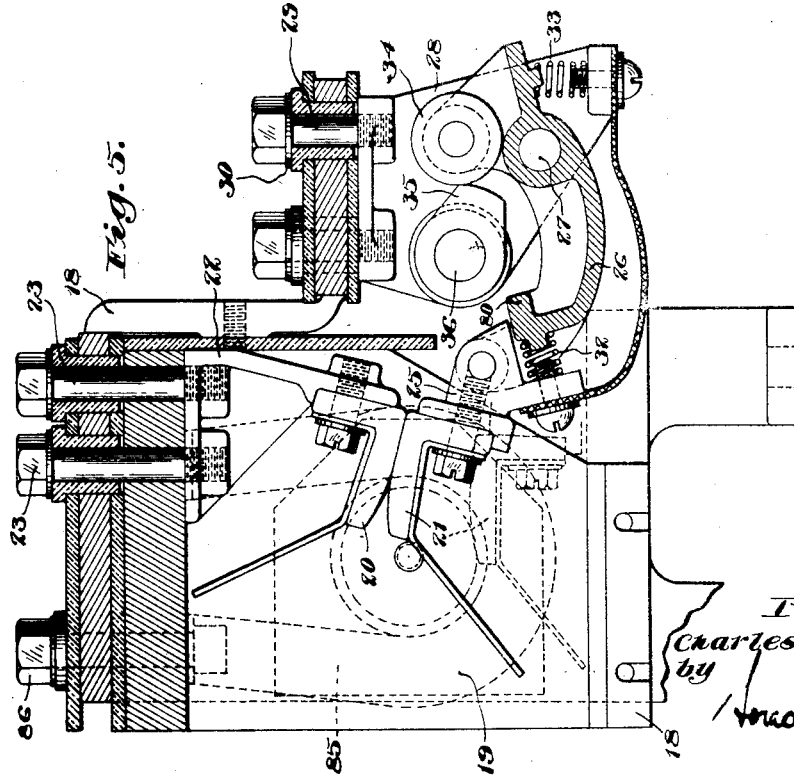
Fig. 5 is a transverse vertical section of one of the contact switches taken substantially on the line 5—5, Fig. 2.

The switch casing 18 is divided into a plurality of compartments by vertical insulating partitions 19, each of said compartments containing a contact switch comprising a stationary contact member 20 (see Fig. 5) and a movable contact member 21. Each of the stationary contact members 20 is carried by a bracket or hanger 22 secured to the casing 18 by bolts 23 electrically connected with said bracket or hanger but insulated from the casing. The bolts 23 of the several hangers 22 are respectively connected to blow out coils 85 located in the partitions 19, and thence, through bolts 86 and conductors 24 (Fig. 4), to the several resistance elements 17. Each of the contact members 21 is bolted or otherwise secured to a rocker 25 pivoted to the end of a lever 26 fulcrumed at 27 to a bracket or hanger 28 secured to the casing 18 by bolts 29 electrically connected to the bracket 28 but insulated from the casing 18, all of the bolts 29 being connected by a conductor 30 (see also Fig. 2) with each other and with one of the terminals 41 of a reversing switch, designated as a whole in Fig. 4 by the numeral 31. Interposed between the rockers 25 and the levers 26 are springs 32 tending normally to move said rockers upwardly about their pivots, whereby, as the corresponding ends of the levers 26 are raised, the contact members 21 are caused firmly to engage the contact members 20, the springs 32 yielding to compensate for excess movement of said levers. The ends of the levers 26 which carry the contact members 21 are normally held depressed, to disengage the contact members 20 and 21 and break the circuit through the several switches, by means of springs 33 interposed between the opposite ends of said levers and the hangers 28. For the purpose of moving the levers 26 against the resistance of the springs 33 in the direction to engage the contact members 20 and 21 and close the circuit, each of said levers is provided with a roller 34 which is engaged by a cam 35 on an operating shaft 36 suitably journaled in the switch casing 18 and in the hangers 28. The several cams 35 are disposed in different angular positions on the shaft 36, whereby as said shaft is rotated the several switches will be successively closed and thereafter opened to vary the amount of resistance interposed in the circuit. Each of the levers 26 is provided with a surface or projection 80 which is engaged by the corresponding cam 35, after the latter has passed out of engagement with the roller 34, thereby positively depressing the lever 26 and opening the circuit through the corresponding switch in case of sticking of the contact members 20 and 21 and failure of the spring 33 to separate them.

Referring to Figs. 1 to 4 and 9, the reversing switch 31 comprises a disk 37 of insulating material mounted on a shaft 51 journaled in suitable brackets 52 in the main casing 15 and provided at its end with a suitable operating handle 53 at the exterior of said casing. On the opposite faces of the disk 37 are secured contact or conductor segments 38 relatively angularly disposed at an angle of approximately 180° from one another, each of said segments having a central projection 39 extending through to the opposite face of the disk at a point between the ends of the other segment. As shown in Figs. 9 and 9ª, the conducting segment on the back of the disk 37 terminates at 38ª, while the segment on the front of the disk terminates at 38ᵇ the ends of these segments overlapping, but being insulated from each other by the disk itself. Co-operating with the contact segments 38 are four flexible contact members or brushes 40, 41, 42, and 43, pressed into yielding engagement with said segments by means of leaf springs 70 secured to insulating blocks or plates 71 carried by arms 72 projecting from the brackets 52, said springs engaging the contact members through insulating buttons 75. Said contact members are arranged in pairs at opposite sides of the disk 37 and are electrically connected to binding posts 73 carried by the plates or blocks 71. The contact members, springs 70, and binding posts 73, are all secured, by means of bolts 74, to the plates 71 which, in turn, are secured to the arms 72 by means of bolts 76 and are separated from each other by spacing blocks 77, one of which is of sufficient length to extend upwardly and downwardly between adjacent binding posts 73. The contact members 40 and 41 are electrically connected through suitable conductors secured to the corresponding binding posts 73, with one of the line wires and with the armature 46 of the motor; the member 43 is similarly connected, as above stated, with the conductor 30 of the switch mechanism; and the member 42 with the armature. The shunt field coil 50 of the motor is connected at one end with the conductor 30 and at its opposite end with one of the line wires, 45. The construction of the reversing switch is such that when the disk 37 is in one angular position, as shown in Fig. 1, the conductors 41 and 43 will be electrically connected with one another by one of the segments 38, while the terminals 40 and 42 will be connected by the other segment. With the disk 37 in an angular position 90° removed from that above referred to (shown in Fig. 9), the terminals 40 and 41 will be connected through the projection 39 on one of the segments 38, and the terminals 42 and 43 through the projection on the other segment.

From the foregoing it will be understood that, by operating the reversing switch 31, the current may be caused to flow through the armature 46 of the motor in one or the other direction to cause rotation of said motor in either direction, while by turning the cam shaft 36 into a position to close a suitable switch 20, 21, the current to said motor may be controlled by interposing in the circuit any desired resistance through the coils 17.

For operating the switch controlling shaft 36, the following mechanism is provided. Journaled in a bracket 54 in the main casing 15 is a shaft 55 extending through the wall of the casing and having secured to its end exterior to the casing an operating handle 56. Secured to the opposite end of the shaft 55 is a bevel gear 57 which meshes with a co-operating bevel pinion 58 journaled on a stud 59' carried by the wall of the switch casing 18. Secured to or formed integral with the pinion 58 is a spur gear 59 which meshes with a gear 60 fast upon the end of the shaft 36. By the foregoing connections movement of the handle 56 into successive positions causes the several cams 35 to engage and operate their respective switches to close the circuit therethrough. In order to position the shaft 36 angularly, and to retain the same in its positions for closing the several switches, respectively, said shaft has fast thereon a notched disk or star wheel 61 with which cooperates the beveled end of a plunger or slide 62 mounted to reciprocate in a guide 63 carried by the end wall of the switch casing 18 and normally pressed toward said wheel or disk 61 by means of a leaf spring 64.

For the purpose of preventing operation of the reversing switch 31 when the shaft 36 is in an angular position to close the circuit through any of the switches 20, 21, and also for the purpose of locking said shaft 36 against operation to close any of said switches except when the reversing switch is in one or the other of its extreme angular positions, the following interlocking mechanism is provided. The gear 57 is formed with a segmental peripheral surface 65 adapted to cooperate with the peripheral surface of a segment 66 fast upon the shaft 51. The convex portion of the surface 65 is interrupted at one point by a concave segmental recess 67 adapted to fit the convex surface of the segment 66. Similarly, the segment 66 is formed with two concave recesses 68 adapted to receive and fit a convex portion of the surface 65. The arrangement is such that, when the shaft 51 is turned to bring the disk 37 into one or the other of its extreme angular positions above referred to, one or the other of the recesses 68 will be brought opposite the surface 65, and when the shaft 55 is in the position to open all of the switches 20, 21, the recess 67 will be brought opposite the segment 66. As shown in Fig. 8, the shaft 55 has been turned into a position to close one of the switches 20, 21, and at this time the convex surface of the segment 65, by engagement with one of the notches 68 in the segment 66, locks the operating shaft 51 of the reversing switch against angular movement. By turning the shaft 55 into the position to shut off the current, the shaft 51 of the reversing switch is unlocked, permitting said shaft to be turned from the position shown into its opposite extreme position, and during this turning movement engagement of the periphery of the segment 66 with the notch 67 will lock the shaft 55 against operation. When the shaft 51 reaches its opposite extreme angular position, the other notch 68 is brought opposite the surface 65 unlocking the shaft 55, rotation of which, however, will serve to bring the convex surface of the segment 65 into engagement with the last mentioned notch 68, thereby locking the shaft 51 in its adjusted position.

The controller operating shaft 55 and the reversing switch shaft 51 are disposed parallel to one another and transverse to the cam shaft 36 and to the length of the apparatus. By this arrangement, and also by the use of the contact switches 20, 21, there is provided an exceedingly compact, efficient, and convenient current controlling and reversing apparatus particularly well adapted for use in a mining machine in that it occupies considerably less space than the drum controllers usually employed in such machines, is of a shape conforming more conveniently to the machine structure, and is capable of controlling the currents with greater reliability.

The arrangement of the controller handles 53 and 56 with respect to the other parts of the apparatus is such that when the current is shut off and the reversing switch is in its normal or "forward" position, said handles occupy positions of adjacent parallelism, as shown in Fig. 1, and when the reversing switch is turned to the "reverse" position said handles will be approximately at right angles to one another (see Fig. 8). This is of considerable importance in that it permits the machine to be safely operated by unskilled and more or less unintelligent men, since these cardinal positions of the controller handles may be readily learned and remembered.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a motor controlling mechanism, a rotary circuit controller, a rotary reversing switch arranged with its axis extending in a direction transverse to the direction of the axis of said controller and disposed at one end of the latter, operating means for said reversing switch, and operating means for said controller adjacent the operating means for said reversing switch.

2. In a motor controlling mechanism, a rotary circuit controller, a rotary reversing switch arranged with its axis extending in a direction transverse to the direction of the axis of said controller and disposed at one end of the latter, operating means for said reversing switch, and operating means for said controller intermediate the end of the latter adjacent the reversing switch and said reversing switch.

3. In a motor controlling mechanism, a rotary circuit controller, a rotary reversing switch arranged with its axis extending in a direction transverse to the direction of the axis of said controller and disposed at one end of the latter, operating means for said reversing switch, and operating means for said controller adjacent the operating means for said reversing switch and including an operating shaft parallel to the axis of said reversing switch.

4. In a motor controlling mechanism, a rotary circuit controller, a rotary reversing switch arranged with its axis extending in a direction transverse to the direction of the axis of said controller and disposed at one end of the latter, operating means for said reversing switch, and operating means for said controller intermediate the end thereof adjacent the reversing switch and said reversing switch and including an operating shaft parallel to the axis of said reversing switch.

5. In a motor controlling mechanism, a rotary controller, a rotary reversing switch, the axes of said switches being disposed the one at right angles to a plane containing the other at a point beyond the end of the latter axis, and means for operating said switches including an operating handle whose axis of rotation lies between the end of the second mentioned and the first mentioned axis.

6. In a motor controlling mechanism, a rotary controller, a rotary reversing switch, the axes of said switches being disposed the one at right angles to a plane containing the other at a point beyond the end of the latter axis, and means for operating said switches including a reversing switch operating member and a controller operating handle whose axis of rotation lies between the end of the second mentioned and the first mentioned axis.

7. A motor controlling mechanism comprising, in combination, a circuit controller, a rotary reversing switch arranged with its axis transverse to the axis of said controller, operating means for said controller and reversing switch comprising parallel shafts, and interlocking elements on said shafts.

8. Motor controlling means comprising, in combination, a series of contact switches, a shaft, a series of cams on said shaft for operating said switches successively, a rotary reversing switch arranged with its axis transverse to the axis of said shaft, and manually operable means rotatable on parallel axes for operating said shaft and said reverse switch.

9. Motor controlling means comprising, in combination, a rotary circuit controller, a reversing switch comprising a shaft arranged transverse to the axis of said controller, a disk carried by said shaft, contact segments carried by said disk, contact members cooperating with said contact segments, and operating means for said circuit controller rotatable on an axis perpendicular to the plane of said disk.

10. Motor controlling means comprising, in combination, a series of contact switches, a shaft, a series of cams on said shaft for operating said switches successively, a reversing switch comprising a shaft arranged transverse to said first named shaft, a disk carried thereby, contact segments carried by said disk, contact members cooperating with said contact segments, and interlocking means for said contact switches and reverse switch including an operating member for said shaft rotatable on an axis perpendicular to the plane of said disk.

11. In an apparatus of the character described, in combination, a rotary circuit controller including a shaft, an operating shaft arranged transverse to said controller shaft, an operating handle on said operating shaft, gearing connecting said shafts, a rotary reversing switch arranged with its axis parallel to the axis of said operating shaft, operating means for said rotary reversing switch, and interlocking connections between the same and said operating shaft.

12. In an apparatus of the character described, the combination with a series of contact switches, a cam shaft, a series of cams on said shaft for operating said switches successively, an operating shaft, and gearing connecting said operating shaft and cam shaft, of a reversing switch having an operating shaft disposed parallel to said first named operating shaft, and interlocking segments carried by said operating shafts.

13. In an apparatus of the character described, in combination, a rotary circuit controller including a shaft, an operating shaft arranged transverse to said controller shaft, an operating handle on said operating shaft, gearing connecting said shafts, a reversing switch having an operating shaft disposed parallel to said first named operating shaft, and interlocking segments carried by said operating shafts.

14. In an apparatus of the character described, the combination with a circuit controller having an operating shaft, said controller having a plurality of electrical contacting positions, of a reversing switch having an operating shaft disposed parallel to said first named shaft, a locking segment on said controller operating shaft having a convex surface and a notch, and a locking segment on said switch operating shaft having a convex surface adapted to enter the notch in said first named segment and a plurality of concave notches adapted to receive the convex surface on said first named segment, said latter notches allowing said switch to have a plurality of electrical contacting positions.

15. In an apparatus of the character described, in combination, a main casing, a resistance casing within said main casing, resistance elements therein, a switch casing within said main casing, circuit controlling devices in said switch casing for controlling the circuits through said resistance elements, operating mechanism for said circuit controlling devices within said main casing, a reversing switch also in said main casing, and interlocking controlling devices for said operating mechanism and reversing switch.

16. In an apparatus of the character described, in combination, a main casing, a resistance casing within said main casing, resistance elements therein, a switch casing within said main casing, circuit controlling mechanism in said switch casing for controlling the circuits through said resistance elements, said mechanism including a shaft journaled in said switch casing, an operating shaft in said main casing and arranged transverse to said controller shaft, gearing connecting said shafts, an operating handle on said operating shaft at the exterior of said casing, a reversing switch in said main casing, and an operating handle for said reversing switch located at the exterior of said casing.

17. In an apparatus of the character described, in combination, a main casing, a resistance casing within said main casing, resistance elements therein, a switch casing within said main casing, circuit controlling devices in said switch casing for controlling the circuits through said resistance elements, operating mechanism for said circuit controlling devices, said mechanism being located within said main casing and having an operating shaft extending to the exterior thereof, a reversing switch in said main casing having an operating shaft disposed parallel to said first named shaft and also extending to the exterior of said casing, interlocking segments carried by said shafts within said main casing, and operating devices carried by said shafts at the exterior of said main casing.

18. In an apparatus of the character described, in combination, a main casing, a resistance casing within said main casing, resistance elements therein, a switch casing within said main casing, said switch casing having a plurality of compartments, a series of contact switches arranged in said compartments, respectively, a shaft journaled in said switch casing, a series of cams on said shaft for operating said switches successively, operating mechanism for said shaft within said main casing, a reversing switch also in said main casing, and interlocking controlling devices for said operating mechanism and reversing switch including operating means located at the exterior of said main casing.

19. In an apparatus of the character described, in combination, a series of contact switches, means for normally maintaining them in open circuit position, a cam shaft, and a series of cams on said shaft for operating said switches successively, each of said switches having means engaged by the corresponding cam for positively closing said switch and means engaged by said cam for positively opening said switch in the event that said first mentioned means fails to operate.

20. In an apparatus of the character described, in combination, a rotary circuit controller having an operating handle, and a reversing switch having an operating handle said handles occupying positions of adjacent parallelism when said controller is positioned to shut off the current and said reversing switch is in its normal position, said positions being such that said handles cannot traverse the axes of each other.

21. In an apparatus of the character described, in combination, a rotary circuit controller having an operating handle, and a reversing switch having an operating handle, said handles occupying positions of adjacent parallelism when said controller is positioned to shut off the current and said reversing switch is in its normal position, and occupying positions at right angles to one another when said reversing switch is in its reversing position, said positions being such that said handles cannot traverse the axes of each other.

22. In an electrical controlling device, a rotatable disc, conducting elements carried one on each side of said disc, each of said elements being wholly insulated from the other and each having a portion extending through said disc to the opposite side of the latter, and plural stationary contact means at opposite sides of the plane of said disc, the extent of each of said elements being sufficient to permit simultaneous contact with the contact means at its respective side of said disc.

23. In an electrical controlling device, a rotatable disc, conducting elements carried one on each side of said disc, each of said elements being wholly insulated from the other and each having a portion extending through said disc to the opposite side of the latter and said elements being arranged on said disc in positions such that said portions are substantially diametrically opposite each other, and plural stationary contact means at opposite sides of the plane of said disc, the extent of each of said elements being sufficient to permit simultaneous contact with the contact means at its respective side of said disc.

24. In an electrical controlling device, a disc rotating on a fixed pivot, a plurality of relatively stationary contacts at each side of the plane of said disc, and contact means rotatable with said disc selectively operative to effect connection only between the contacts at the same sides of the disc or to connect contacts at the opposite sides thereof.

25. In an electrical controlling device, a rotatable disc, a pair of contacts at each side of the plane of said disc, and a pair of conducting members carried by said disc but wholly insulated from each other operative when said disc occupies different positions selectively to connect the contacts of each pair or to connect the contacts of one pair with the contacts of the other.

In testimony whereof I affix my signature.

CHARLES W. WYMAN.